(12) United States Patent
Atkinson

(10) Patent No.: US 9,276,490 B2
(45) Date of Patent: Mar. 1, 2016

(54) VOLTAGE SETTING OF ADAPTER

(75) Inventor: Lee Warren Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 297 days.

(21) Appl. No.: 14/000,835

(22) PCT Filed: Mar. 9, 2011

(86) PCT No.: PCT/US2011/000444
§ 371 (c)(1),
(2), (4) Date: Aug. 21, 2013

(87) PCT Pub. No.: WO2012/121687
PCT Pub. Date: Sep. 13, 2012

(65) Prior Publication Data
US 2013/0322138 A1    Dec. 5, 2013

(51) Int. Cl.
| | | |
|---|---|---|
| H02M 7/04 | (2006.01) | |
| H02M 7/02 | (2006.01) | |
| G06F 1/26 | (2006.01) | |
| G05F 1/46 | (2006.01) | |

(52) U.S. Cl.
CPC . *H02M 7/02* (2013.01); *G06F 1/26* (2013.01); *G05F 1/46* (2013.01)

(58) Field of Classification Search
CPC ............. H02M 7/00; H02M 7/02; G06F 1/26; G05F 1/46; G05F 1/462
USPC ................................................ 363/74, 76, 77
See application file for complete search history.

(56) References Cited

U.S. PATENT DOCUMENTS

| | | | |
|---|---|---|---|
| 6,828,760 B2 | 12/2004 | Massey et al. | |
| 7,392,410 B2 | 6/2008 | Allen et al. | |
| 7,526,659 B2 | 4/2009 | Sawyers et al. | |
| 7,581,130 B2 | 8/2009 | Carroll et al. | |
| 7,653,823 B2 | 1/2010 | Benton et al. | |
| 7,821,800 B2 * | 10/2010 | Chiang | 363/56.1 |
| 2003/0025401 A1 | 2/2003 | Popescu-Stanesti | |
| 2005/0242786 A1 | 11/2005 | Sawyers et al. | |
| 2006/0277420 A1 | 12/2006 | Nguyen | |
| 2007/0279954 A1 | 12/2007 | Garrett et al. | |
| 2009/0230931 A1 | 9/2009 | Chen | |
| 2012/0235630 A1* | 9/2012 | Qiu et al. | 320/107 |
| 2013/0077349 A1* | 3/2013 | Jin et al. | 363/15 |

FOREIGN PATENT DOCUMENTS

| | | |
|---|---|---|
| CN | 101145698 A | 3/2008 |
| TW | 200805026 A | 1/2008 |

OTHER PUBLICATIONS

International Search Report and Writen Opinion received in PCT Application No. PCT/US2011/000444, mailed on Nov. 30, 2011, 10 pgs.
Chinese Office Action dated Jun. 5, 2014 issued in Appl. No. 201180068631.1; 10 pages.

* cited by examiner

*Primary Examiner* — Matthew Nguyen
(74) *Attorney, Agent, or Firm* — HP Legal Department

(57) ABSTRACT

Embodiments herein relate to setting a voltage of an adapter (100, 200). In an embodiment, the adapter is to measure a current output by the adapter, compare the measured current at the adapter to a first current and to output a DC voltage. The adapter is to set a level of the DC voltage output by the adapter based on the comparison.

12 Claims, 7 Drawing Sheets

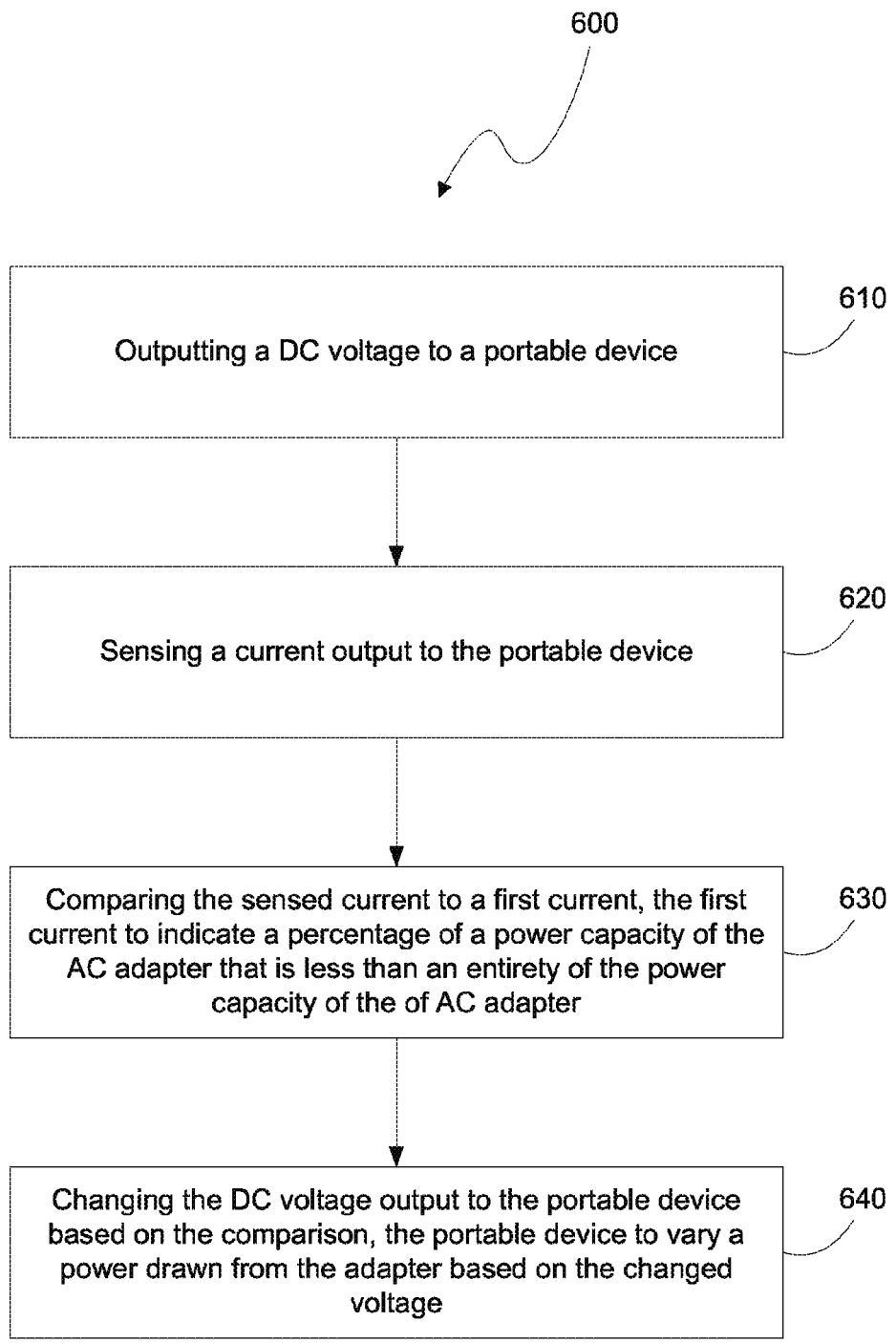

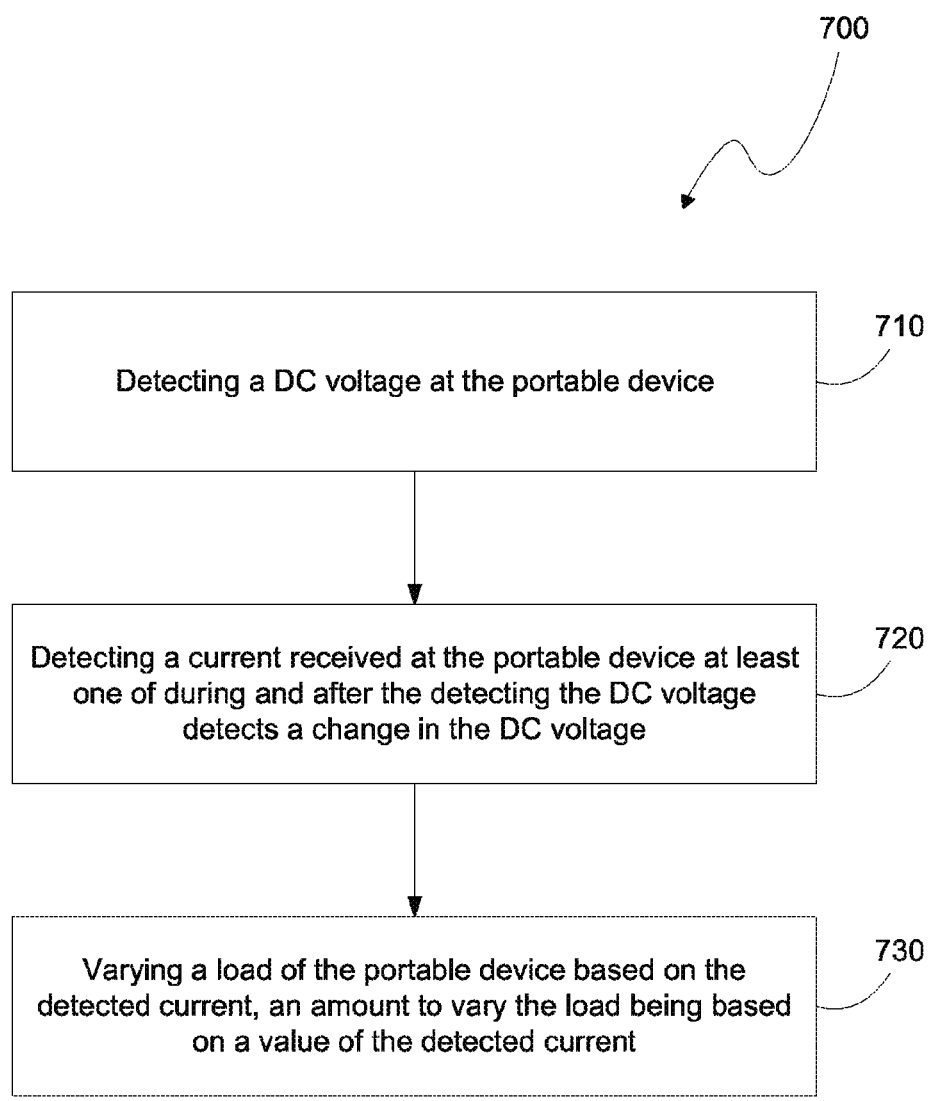

VOLTAGE SETTING OF ADAPTER

BACKGROUND

Traditionally, different types of notebook computers used different size and/or types of direct current (DC) plugs. Therefore, connecting a DC source, such as an alternating current (AC) adapter, to the wrong notebook computer was not possible because a connector of the DC source would be physically incapable of mating to the DC plug of the notebook.

However, newer notebook computers now have the same type of DC plugs despite having different power requirements. As a result, the DC source may be connected to the wrong notebook computer. For example, the notebook computer may attempt to draw power beyond a capacity of the DC source. Thus, the notebook computer and/or DC source may malfunction.

BRIEF DESCRIPTION OF THE DRAWINGS

The following detailed description references the drawings, wherein:

FIG. 6 is a flowchart of an example method for varying a voltage at the adapter;
and
FIG. 7 is a flowchart of an example method for varying a power drawn at the portable device.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, weft-known processes, structures and techniques may be shown without unnecessary detail in order to avoid obscuring embodiments.

Embodiments provide a generally low cost and reliable method and/or device to signal the power capacity of the AC adapter. For example, embodiments may include an adapter to dynamically lower its output DC voltage to a portable device when a threshold power capacity that is less than a maximum power capacity of the adapter is reached. The portable device may then lower its power consumption before the maximum power capacity of the adapter is reached. As a result, the portable device and/or adapter may prevent any malfunctions or damage caused by the portable device attempting to exceed the maximum power capacity of the adapter.

In addition, embodiments of the adapter are able to signal to the portable device that the threshold capacity is reached without any additional connections therebetween. Thus, embodiments may be manufactured with little or no additional manufacturing costs or complexity.

Figure 1:
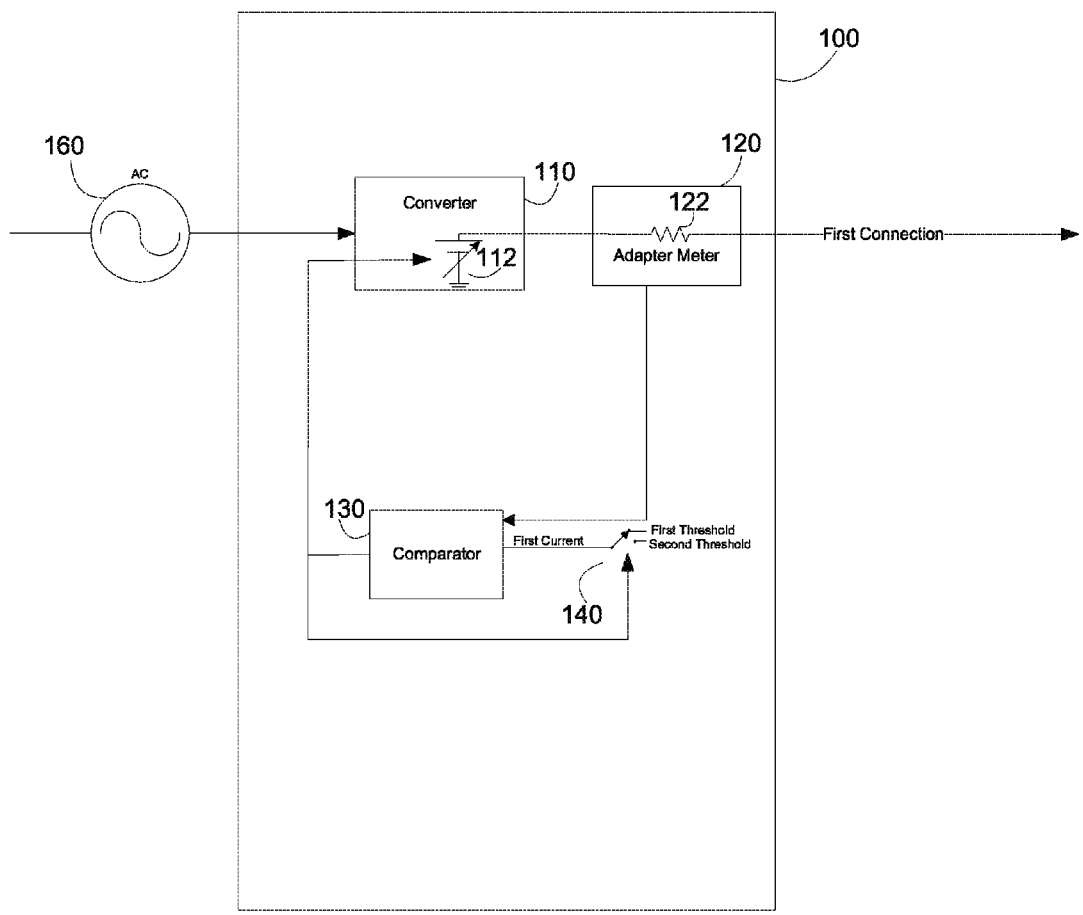
FIG. 1 is a block diagram of an example adapter.

FIG. 1 is a block diagram of an example adapter 100. The adapter 100 may be a type of device that supplies electrical energy to one or more electric loads. Moreover, the adapter 100 may convert energy from one to type to another type. For example, the adapter may convert an Alternating Current (AC) voltage source into a Direct Current (DC) voltage source. In the embodiment of FIG. 1, the adapter 100 includes a converter 110, an adapter meter 120, a comparator 130, and a switch 140. The adapter 100 is to receive an AC voltage from an external AC source 160, such as a wall outlet providing AC voltage at 120 Volts (V), 60 Hertz (Hz) or 220 V, 50 Hz. However, embodiments of the AC source 160 are not limited to a wall outlet, and may also include other types of AC sources as well.

The converter 110 is to receive the AC voltage and to output a DC voltage via a variable voltage source 112 through a first connection. The converter 110 may include a transformer (not shown) to transform the AC voltage into the DC voltage. The DC voltage is to be output via the variable voltage source 112, with the variable voltage source 112 to vary the DC voltage output in response to a signal output by the comparator 130, as explained in greater detail below.

The adapter meter 120 is to measure a current output by the adapter 100 at the first connection and output the measured current to the comparator 130. The adapter meter 120 may, for example, be an ammeter.

The comparator 130 is to compare the measured current to a first threshold current and output a comparison signal to the variable voltage source 112 and the switch 140, based on the comparison. Generally, the comparator 130 may be an electrical device to compare two or more voltages or currents and to base its output on the comparison.

In FIG. 1, the first threshold current is to indicate a percentage of a power capacity of the adapter 100 that is less than an entirety of the power capacity of the of adapter 100, such as 90% of the adapter's 100 power capacity. The power capacity may indicate a maximum power output capability of the adapter 100. In FIG. 1, the comparator 130 may output the comparison signal at a first voltage if the measured current is less than the first current and output the comparison signal at a second voltage different than the first voltage if the measured current is greater than or equal to the first current.

The output of the comparator 130, such as the first or second voltage is output to the variable voltage source 112 of the converter 110 to vary the DC voltage, where the variable voltage source 112 is to vary the DC voltage output based on a voltage level received from the comparator 130. For example, the variable voltage source 112 may set the DC voltage to a lower voltage, such as 10 V, upon receiving the first voltage, and may set the DC voltage to a higher voltage, such as 20 V, upon receiving the second voltage. While the comparator 130 is configured to increase the level of the DC voltage output to by the converter 110 when the measured current is greater than or equal to the first current, embodiments are not limited thereto. For example, in another embodiment, the comparator 130 may be configured to decrease the level of the DC voltage output to by the converter 110 when the measured current is greater than or equal to the first current.

The output of the comparator 130 is also output to the switch 140. The switch 140 may be any type of electrical, mechanical or electromechanical device capable of switching between two or more electrical contacts. The switch 140 is to select between a first threshold current and a second threshold current different than the first threshold current, based on the output of the comparator 130 and to output the selected current as the first current to the comparator 130. The first and second threshold currents may, for example, be determined experimentally or set according to a manufacturer's or user's specifications.

For example, the first threshold current may be greater than the second threshold current, and the switch 140 may be initially set to the greater threshold current, e.g. the first threshold current. In embodiments, the first and second threshold currents may, for example, be 2 and 1 amps or 4 and 2 amps, respectively. In FIG. 1, the switch 140 is to receive the comparison signal. If the comparison signal is at the first voltage, the switch 140 is to be set to the first threshold current and if the comparison signal is at the second voltage, the switch 140 is to be set to the second threshold current.

Thus, in operation, if the measured current being output by the adapter 100 at the first connection is greater than or equal to the first current, which is initially set as the first threshold current, the comparator 130 will output the second voltage. Accordingly, the converter 110 will increase the DC voltage output. Due to a constant power being output from the adapter 100, the measured current will then decrease and perhaps be lower than the first threshold current. For example, if the first current is 1.1 Amp (A), the measured current is 2 A, and the initial voltage is 10 V, then the adapter 100 switching from outputting 10 V to 20 V, would result in the measured current dropping from 2 A to 1 A.

Thus, the first current is set to the second threshold current by the switch 140 in response to receiving the second voltage, where the second threshold current will be lower than the measured current at the second voltage, e.g. less than 1 A. Hence, the comparator 130 will not output the first voltage again and thus lower back the DC voltage output by the converter 110.

The first connection may represent a point of connection, such as a pin, tip or hole, to be connected to an external load, such as a portable device.

Figure 2:
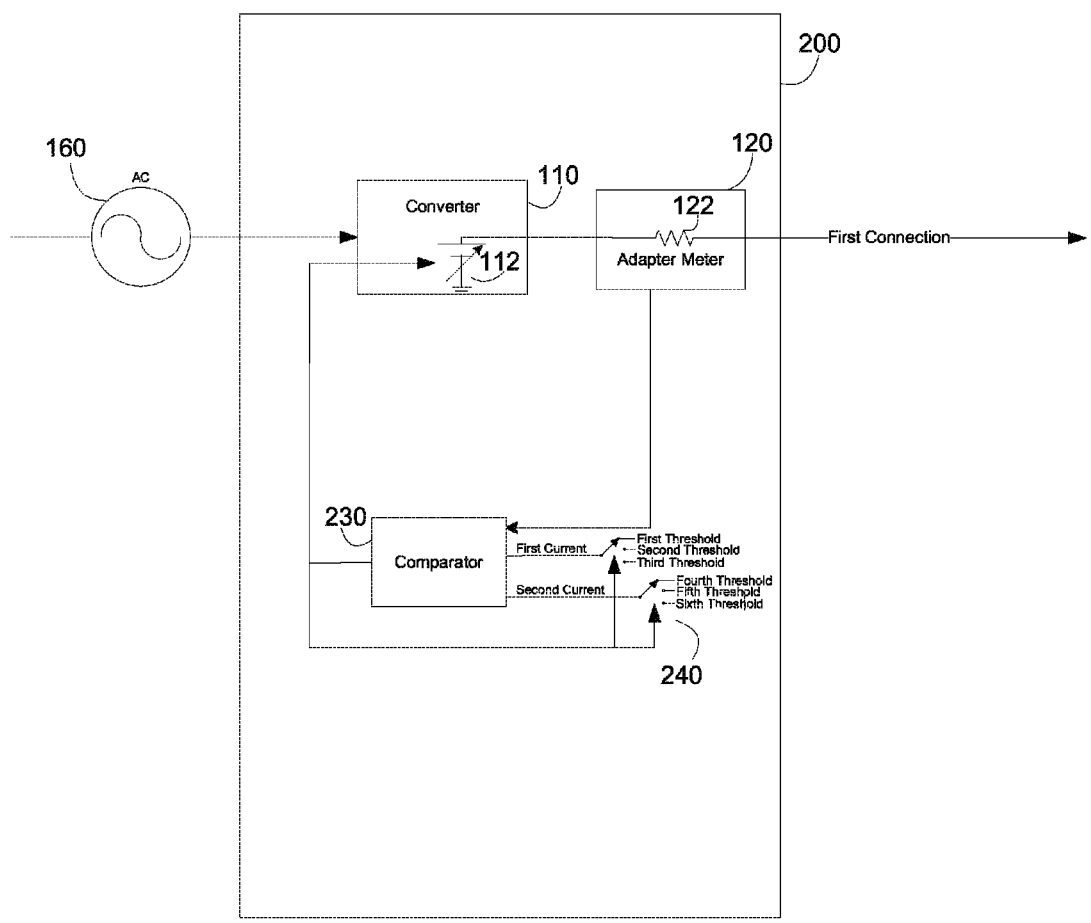
FIG. 2 is a block diagram of another example adapter.

FIG. 2 is a block diagram of another example adapter 200. In this embodiment, the adapter 200 is similar to the adapter 100 of FIG. 1, except the comparator 230 is to compare the measured current to a plurality of currents and each of the switches 240 are to switch between more than two threshold currents for each of the currents. In addition, the comparator 230 is to output from between more than two voltages.

For example, the converter 110 is to set the DC voltage to a first output voltage when the comparator 230 outputs the first voltage to indicate that the measured current is less than a first current of the plurality of currents by outputting the first voltage. The converter 110 is to set the DC voltage to a second output voltage greater than the first output voltage when the comparator 230 outputs the second voltage to indicate that the measured current is greater than or equal to the first current and less than a second current, where the second current is greater than the first current. The converter 110 is to set the DC voltage to a third output voltage that is greater than the second output voltage when comparator 230 outputs a third voltage to indicate that the measured current is greater than or equal to the second current.

The output of the comparator 230 is also input to the switches 240, where the switches 240 operate similarly to the switch 140 in FIG. 1. However, the switches 240 each select between three threshold currents, instead of two threshold currents. For example, the switches 240 may respectively be set to first and fourth threshold currents upon receiving the first voltage. Also, the switches 240 may respectively be set to second and fifth threshold currents upon receiving the first voltage. In addition, the switches 240 may respectively be set to third and sixth threshold currents upon receiving the first voltage. The first through third threshold currents may have progressively lower values and the fourth through sixth threshold currents may have progressively lower values.

In FIG. 2, the first and second currents may relate to different power capacities of the adapter 200. For example, the first threshold current may relate to a lower, such as 10%, of a maximum power capacity of the adapter and the second threshold current may relate to a higher, such as 90%, of the maximum power capacity of the adapter. While FIG. 2 only shows the two threshold currents, embodiments may include more than two threshold currents.

Figure 3:
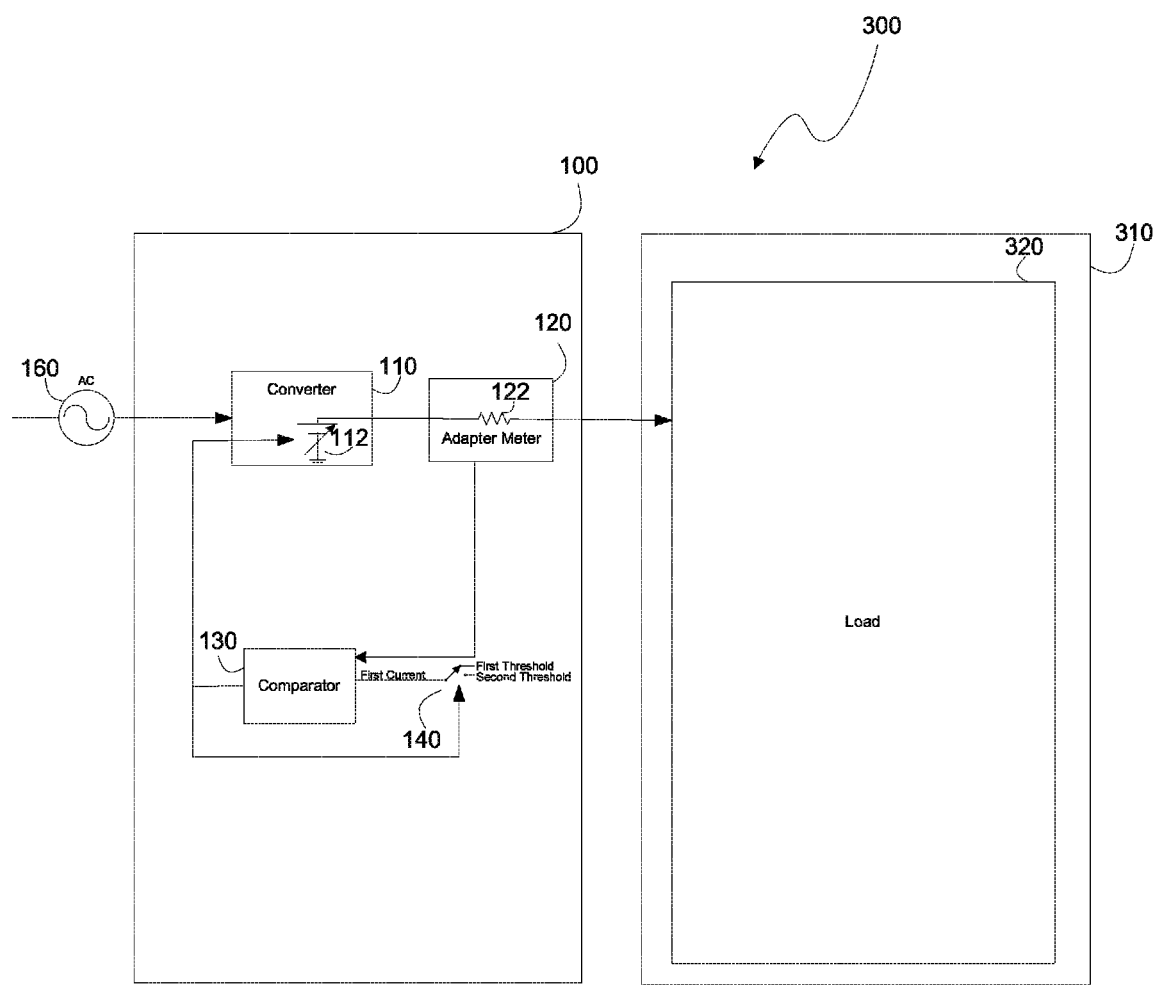
FIG. 3 is a block diagram of an example system including the adapter of FIG. 1.

FIG. 3 is a block diagram of an example power system 300 including the adapter 100 of FIG. 1. However, embodiments may also include the adapter 200 of FIG. 2 or other similar types of adapters. In this embodiment, the power system 300 includes the adapter 100 of FIG. 1 and a portable device 310 connected to the adapter 100 or 200. The portable device 310 includes a load 320 to receive power through the first connection. The load 320 may refer to power drawn by the components of the portable device 310, such as a battery, a processor, a display, a hard drive, a controller, and the like of the portable device 310. The portable device 310 is to vary the load 320 of the portable device 310 based on a change in the DC voltage output by the adapter 100 or 200 or received at the portable device 310 via the first connection, as will be explained in greater detail below in FIGS. 4 and 5 below.

In FIG. 3, the power system 300 is shown to include the portable device 310. Embodiments of the portable device 310 may include, for example, a notebook computer, a desktop computer, an all-in-one system, a slate computing device, a portable reading device, a wireless email device, a mobile phone, and the like.

Figure 4:
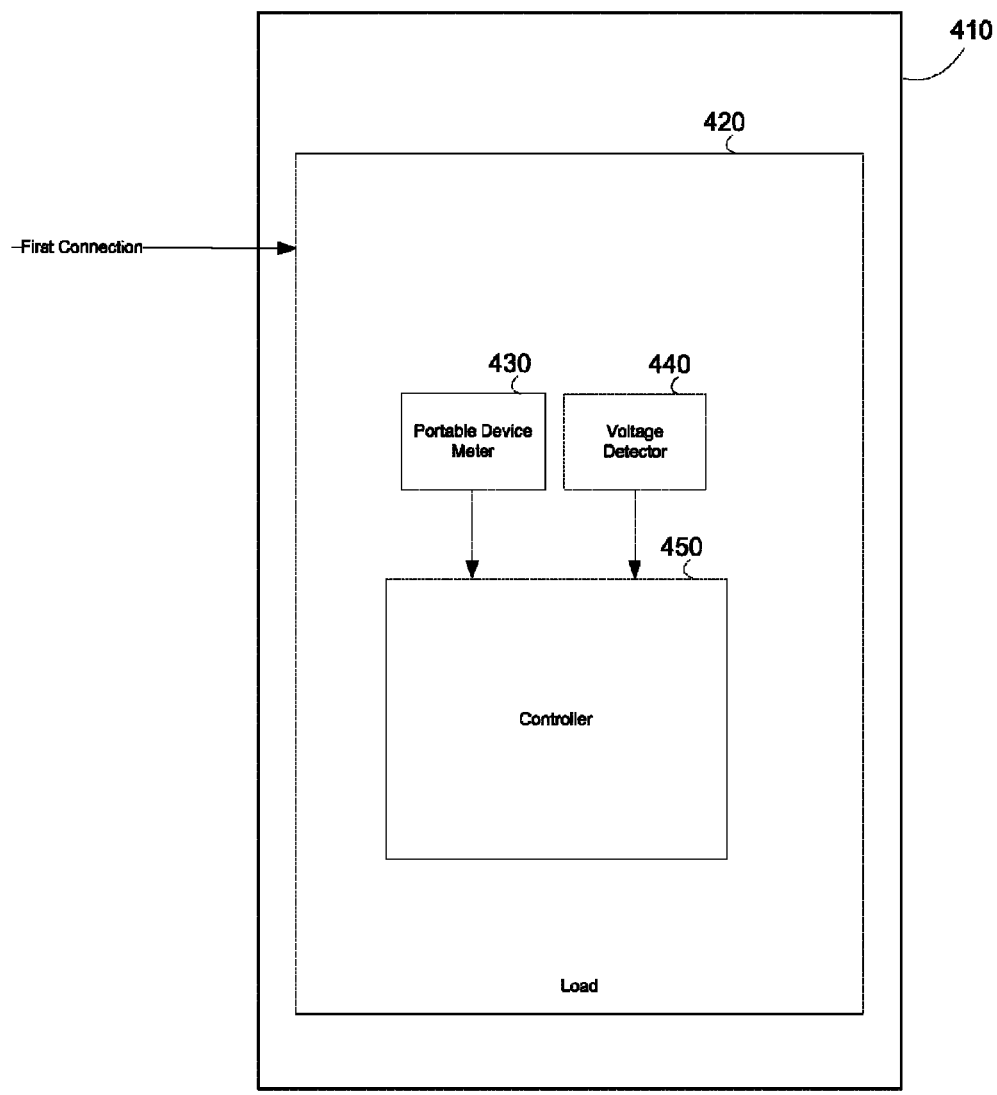
FIG. 4 is a more detailed example block diagram of the portable device of FIG. 3.

FIG. 4 is a more detailed example block diagram of the portable device 310 of FIG. 3. In this embodiment, a portable device 410 includes the load 420. The load 420 includes a portable device meter 430, a voltage detector 440 and a controller 450.

The voltage detector 440 is to detect a voltage received by the portable device 410 through the first connection and output the detected voltage to the controller 450. The voltage detector 440 may be any type of device configured to measure an electrical potential difference between two points in an electric circuit, such as a voltmeter.

The portable device meter 430 is to measure a current received by the portable device 410 through the first connection and to output the measured current to the controller 450. The portable device meter 430 may, for example, be an ammeter.

The controller 450 is to determine an amount to vary the load 420 based on the current measured by the portable device meter 430 at least one of during and after a change in DC voltage detected by the voltage detector 440, such as in increase in voltage from 10 V to 20 V. The controller 450 may vary the load 420 of the portable device 410 by varying power to at least one of the battery, processor, display, hard drive and other components included in the portable device 410. For example, the controller 450 may stop charging the battery, dim the display, or lower a clock frequency of the processor. Other components of the portable device 410 may also include, for example, the controller 450 or the portable device meter 430.

The controller 450 may be one or more central processing units (CPUs), semiconductor-based microprocessors, and/or other hardware devices suitable for access and execution of instructions stored in a machine-readable storage medium (not shown) located internal or external to the controller 450.

The machine-readable storage medium may be any electronic, magnetic, optical, or other physical storage device that contains or stores executable instructions. The machine-readable storage medium may store one or more applications executable by the controller 450. In one embodiment, the application may determine an amount to vary the load 420 of the portable device 410 by limiting or disabling power to one or more components, based on an amount of current received at the portable device 410 at least one of during and after the change in the DC voltage received at the portable device 410.

Figure 5:
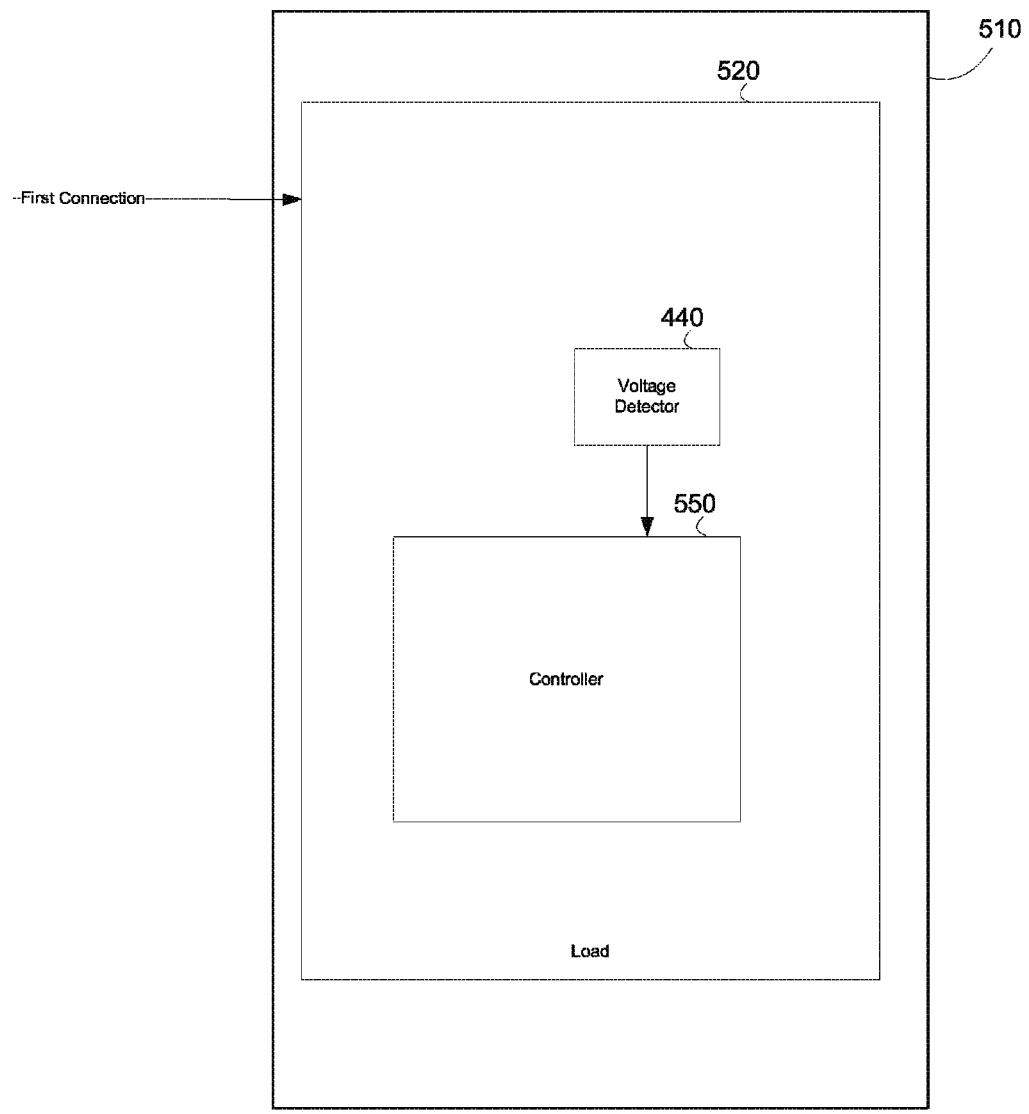
FIG. 5 is another more detailed example block diagram of the portable device of FIG. 3.

FIG. 5 is another more detailed example block diagram of the portable device 310 of FIG. 3. In this embodiment, portable device 510 of FIG. 5 may be similar to the portable device 410 of FIG. 4, except that the portable device 510 does not include the portable device meter 430 of FIG. 4. Instead, controller 550 may indirectly determine the current based on the voltage detected from the voltage detector 440 and the power drawn by the load 520.

FIG. 6 is a flowchart of an example method 600 for adjusting adapter power. Although execution of the method 600 is described below with reference to the adapter 100 of FIG. 1, the adapter 200 of FIG. 2 or other suitable components for execution of the method 600 will be apparent to those of skill in the art.

In the embodiment of FIG. 6, at block 610, the converter 110 of the adapter 100 outputs a DC voltage to the portable device 310 via the first connection. At block 620, the adapter meter 120 of the adapter 100 senses a current output to the portable device 310 via the first connection. Then, at block 630, the comparator 130 of the adapter 100 compares the sensed current to the first current, the first current to indicate a percentage of a power capacity of the adapter 100 that is less than an entirety of the power capacity of the of adapter 100. Lastly, at block 640, the converter 110 of the adapter 100 changes the DC voltage output to the portable device 310 based on the comparison, the portable device 310 is to vary a power drawn from the adapter 100 based on the changed voltage.

FIG. 7 is a flowchart of an example method 700 for varying a power drawn at the portable device 310. Although execution of the method 700 is described below with reference to the portable devices 410 and 510, other suitable devices for execution of the method 700 will be apparent to those of skill in the art. In the embodiment of FIG. 7, at block 710, the voltage detector 440 detects the DC voltage received at the portable devices 410 or 510. Then, at block 720, the controller 550 or the portable device meter 430 detects a current received at the portable device 410 or 510 at least one of during and after the detecting the DC voltage of block 710 detects a change in the DC voltage. Then, at block 730, the controller 450 or 550 varies the load 420 or 520 of the portable device 410 or 510, based on the detected current at block 720, an amount to vary the load being based on a value of the detected current.

In one embodiment, the detecting the current at block 720 may include measuring the current received at the portable device 410 using, for example the portable device meter 430. In another embodiment, the detecting the current at block 720 may instead include determining the current received at the portable device 510 based on the load 420 and DC voltage received at the first connection of the portable device 510.

According to the foregoing, embodiments provide a generally low cost and reliable method and/or device to determine the power capacity of the adapter before a maximum power capacity of the adapter is reached. For example, the portable device computer may correspondingly lower its power consumption before the maximum power capacity of the adapter is reached based on a value of a signal received from the adapter, without any additional connections therebetween.

I claim:

1. An adapter, comprising:
an adapter meter to measure a current output by the adapter at the first connection;
a comparator to compare the measured current at the adapter to a plurality of currents, the plurality of currents to indicate different percentages of a power capacity of the adapter that is less than an entirety of the power capacity of the of adapter; and
a converter to receive an AC voltage and to output a DC voltage via the first connection, wherein:
the comparator is to set the DC voltage to a first output voltage when the measured current is less than a first current of the plurality of currents,
the comparator is to set the DC voltage to a second output voltage greater than the first output voltage when the measured current is greater than or equal to the first current and less than a second current greater than the first current, and
the comparator is to set the DC voltage to a third output voltage greater than the second output voltage when the measured current is greater than or equal to the second current.

2. The adapter of claim 1, wherein the first threshold current relates to a first power capacity of the adapter and the second threshold current relates to a second power capacity of the adapter, the second power capacity being a greater percentage of a maximum power capacity of the adapter than that of the first power capacity.

3. The adapter of claim 1, further comprising:
a plurality of switches, each of the switches to select between a plurality of threshold currents and to output one of the plurality of threshold currents, based on the comparison.

4. A power system, comprising:
an adapter including,
an adapter meter to measure a current output by the adapter at a first connection,
a comparator to compare the measured current at the adapter to a first threshold current, the first threshold current to indicate a percentage of a power capacity of the adapter that is less than an entirety of the power capacity of the adapter, and
a converter to receive an AC voltage and to output a DC voltage via the first connection, the converter to set a level of the DC voltage output by the converter based on the comparison; and
a portable device connected to the adapter and to vary a load of the portable device based on a change in the DC voltage received at the portable device, wherein the portable device is to determine an amount to reduce the load of the portable device based on a current received at the portable device at least one of during and after the change in the DC voltage received at the portable device so that the entirety of the power capacity of the adapter is not reached.

5. The system of claim 4, wherein the portable device includes,
a portable device meter to measure the current received by the portable device, and
a controller to determine an amount to vary the load based on a value of the current measured by the portable device meter at least one of during and after the change in the DC voltage received at the portable device.

6. The system of claim 4, wherein the portable device is to determine the current received based on the load and the DC voltage received at the portable device.

7. The system of claim 4, wherein the portable device includes,
   a voltage detector to detect a voltage received by the portable device, and
   a controller to vary the load based on the change in the DC voltage received at the portable device.

8. The system of claim 7, wherein the controller is to vary the load of the portable device by varying power to at least one of a battery, processor, display and hard drive included in the portable device.

9. The system of claim 4, wherein the converter is, to increase the level of the DC voltage output when the comparator determines the measured current is greater than the first threshold current.

10. A method for setting adapter voltage, comprising:
    outputting, at an adapter, a DC voltage to a portable device;
    sensing, at the adapter, a current output to the portable device;
    comparing, at the adapter, the sensed current to a first current, the first current to indicate a percentage of a power capacity of the adapter that is less than an entirety of the power capacity of the of adapter;
    changing, at the adapter, the DC voltage output to the portable device based on the comparison, the portable device to vary a power drawn from the adapter based on the changed voltage;
    detecting the DC voltage received at the portable device;
    detecting a current received at the portable device at least one of during and after the detecting the DC voltage detects a change in the DC voltage; and
    varying a load of the portable device based on the detected current, an amount to vary the load being based on a value of the detected current.

11. The method of claim 10, wherein the detecting the current received includes measuring the current received at the portable device.

12. The method of claim 10, the detecting the current received detects the current based on the load and the DC voltage received at the portable device.

* * * * *